United States Patent
Briese et al.

(10) Patent No.: US 10,444,047 B2
(45) Date of Patent: Oct. 15, 2019

(54) SENSOR ARRANGEMENT FOR DETERMINING AT LEAST ONE PARAMETER OF A FLUID MEDIUM FLOWING THROUGH A MEASURING CHANNEL

(71) Applicant: Robert Bosch GmbH, Stuttgart (DE)

(72) Inventors: Achim Briese, Palo Alto, CA (US); Torsten Mais, Ludwigsburg (DE); Ulrich Wagner, Munich (DE); Uwe Konzelmann, Asperg (DE)

(73) Assignee: Robert Bosch GMBH, Stuttgart (DE)

( * ) Notice: Subject to any disclaimer, the term of this patent is extended or adjusted under 35 U.S.C. 154(b) by 0 days.

(21) Appl. No.: 15/509,116

(22) PCT Filed: Jul. 22, 2015

(86) PCT No.: PCT/EP2015/066733
§ 371 (c)(1),
(2) Date: Mar. 6, 2017

(87) PCT Pub. No.: WO2016/037750
PCT Pub. Date: Mar. 17, 2016

(65) Prior Publication Data
US 2017/0261359 A1   Sep. 14, 2017

(30) Foreign Application Priority Data
Sep. 8, 2014   (DE) .................. 10 2014 217 870

(51) Int. Cl.
*G01F 1/684* (2006.01)
*G01F 15/00* (2006.01)
(Continued)

(52) U.S. Cl.
CPC .............. *G01F 1/6842* (2013.01); *G01F 1/68* (2013.01); *G01F 1/684* (2013.01); *G01F 5/00* (2013.01); *G01F 13/00* (2013.01); *G01F 15/00* (2013.01)

(58) Field of Classification Search
CPC ........... G01F 1/6842; G01F 5/00; G01F 1/684
See application file for complete search history.

(56) References Cited

U.S. PATENT DOCUMENTS

| | | | | |
|---|---|---|---|---|
| 4,478,076 A | * | 10/1984 | Bohrer | G01F 1/6845 73/204.16 |
| 4,808,009 A | * | 2/1989 | Sittler | F25D 21/02 338/22 SD |

(Continued)

FOREIGN PATENT DOCUMENTS

| CN | 1130940 A | 9/1996 |
|---|---|---|
| CN | 1262736 A | 8/2000 |

(Continued)

OTHER PUBLICATIONS

English machine translation for JP-2014001973.*
(Continued)

*Primary Examiner* — Daniel S Larkin
*Assistant Examiner* — Anthony W Megna Fuentes
(74) *Attorney, Agent, or Firm* — Norton Rose Fulbright US LLP; Gerard Messina (57) ABSTRACT

A sensor arrangement is described for determining at least one parameter of a fluid medium flowing through a measuring channel, particularly of an intake air mass flow of an internal combustion engine. The sensor arrangement includes a sensor housing, in particular a plug-in sensor which is introduced or may be introduced into a flow tube and in which the measuring channel is formed, and at least one sensor chip which is situated in the measuring channel for determining the parameter of the fluid medium. The
(Continued)

sensor chip is attached to a sensor carrier protruding into the measuring channel. The sensor carrier is designed in such a way that it has a chord. The chord has a length of 4.5 mm to 6.5 mm. In a preferred refinement, the sensor carrier is shaped like a double ellipse or a diving board.

11 Claims, 9 Drawing Sheets

(51) Int. Cl.
*G01F 13/00* (2006.01)
*G01F 1/68* (2006.01)
*G01F 5/00* (2006.01)

(56) References Cited

U.S. PATENT DOCUMENTS

| | | | | |
|---|---|---|---|---|
| 4,825,694 A * | 5/1989 | Weibler | G01F 1/684 | 73/204.26 |
| 4,829,814 A * | 5/1989 | Suzuki | G01F 1/684 | 73/114.34 |
| 4,885,938 A * | 12/1989 | Higashi | G01F 1/684 | 73/204.18 |
| 4,914,947 A * | 4/1990 | Davidson | G01F 1/6842 | 73/202.5 |
| 5,140,854 A * | 8/1992 | Sakaue | G01F 1/684 | 73/204.26 |
| 5,717,136 A * | 2/1998 | Aoi | G01F 1/684 | 73/204.26 |
| 5,948,975 A * | 9/1999 | Mueller | G01F 5/00 | 73/114.32 |
| 6,079,264 A * | 6/2000 | Yamakawa | G01F 1/6845 | 73/204.22 |
| 6,170,327 B1 * | 1/2001 | Wildgen | G01F 1/6842 | 73/204.26 |
| 6,240,775 B1 * | 6/2001 | Uramachi | G01F 1/6842 | 73/114.34 |
| 6,382,024 B1 | 5/2002 | Hwang et al. | | |
| 6,557,408 B1 * | 5/2003 | Mueller | G01F 1/6842 | 73/202.5 |
| 6,591,675 B1 * | 7/2003 | Doderer | G01F 1/6842 | 73/204.22 |
| 6,871,534 B1 * | 3/2005 | Hamada | F02D 41/185 | 73/202.5 |
| 7,194,920 B2 * | 3/2007 | Welker | G01F 1/46 | 73/204.21 |
| 7,360,414 B2 * | 4/2008 | Konzelmann | G01F 1/6842 | 73/202.5 |
| 8,205,493 B2 * | 6/2012 | Mais | G01F 1/6842 | 73/202.5 |
| 8,418,548 B2 * | 4/2013 | Konzelmann | G01F 1/6842 | 73/202.5 |
| 8,756,989 B2 * | 6/2014 | Goka | G01F 15/14 | 73/204.26 |
| 9,752,908 B2 * | 9/2017 | Tashiro | G01F 1/684 | |
| 2003/0037610 A1 * | 2/2003 | Roeckel | G01F 1/6842 | 73/204.22 |
| 2004/0069061 A1 * | 4/2004 | Watanabe | G01F 1/6842 | 73/204.26 |
| 2006/0112763 A1 * | 6/2006 | Uramachi | G01F 1/6842 | 73/204.22 |
| 2012/0048005 A1 * | 3/2012 | Renninger | G01F 1/6842 | 73/114.32 |
| 2014/0174166 A1 * | 6/2014 | Mais | F02D 41/18 | 73/114.32 |

FOREIGN PATENT DOCUMENTS

| | | | | |
|---|---|---|---|---|
| DE | 19739949 A1 | 10/1998 | | |
| EP | 0369592 A2 | 5/1990 | | |
| EP | 2525197 A1 | 11/2012 | | |
| JP | 2000241222 A | 9/2000 | | |
| JP | 2010528303 A | 8/2010 | | |
| JP | 2014001973 A * | 1/2014 | | G01F 1/684 |

OTHER PUBLICATIONS

International Search Report for PCT/EP2015/066733, dated Oct. 13, 2015.
Konrad Reif (editor): "Sensoren im Kraftfahrzeug [Motor Vehicle Sensors]," 1st edition, 2010, pp. 146-148.

* cited by examiner

SENSOR ARRANGEMENT FOR DETERMINING AT LEAST ONE PARAMETER OF A FLUID MEDIUM FLOWING THROUGH A MEASURING CHANNEL

BACKGROUND INFORMATION

Numerous methods and devices for determining a flow property of fluid media, i.e., liquids and/or gases, are known from the related art. The flow properties may fundamentally be arbitrary physically and/or chemically measurable properties, which qualify or quantify a flow of the fluid medium. In particular, this may relate to a flow velocity and/or a mass flow and/or a volume flow.

SUMMARY

The present invention will be described hereafter in particular with reference to so-called hot-film airflow sensors, as are described, for example, in Konrad Reif (editor): Sensoren im Kraftfahrzeug ("Sensors In Motor Vehicles"), first edition 2010, pages 146-148. Such hot-film airflow sensors are generally based on a sensor chip, in particular a silicon sensor chip, having a sensor diaphragm as a measuring surface or sensor area, over which the flowing fluid medium may flow. The sensor chip generally includes at least one heating element and at least two temperature sensors, which are situated on the measuring surface of the sensor chip, for example. A mass flow and/or volume flow of the fluid medium may be inferred from an asymmetry of the temperature profile captured by the temperature sensors, which is influenced by the flow of the fluid medium. Hot-film airflow sensors are typically designed as plug-in sensors, which may be introduced permanently or replaceably into a flow tube. For example, this flow tube may be an intake manifold of an internal combustion engine.

A partial flow of the medium flows through at least one main channel provided in the hot-film airflow sensor. A bypass channel is formed between the inlet and outlet of the main channel. In particular, the bypass channel is formed in such a way that it has a curved section for deflecting the partial flow of the medium entering through the inlet of the main channel, the curved section merging in the further course into a section in which the sensor chip is situated. The last-mentioned section represents the actual measuring channel, in which the sensor chip is situated. A means is provided in the bypass channel, which conducts the flow and counteracts a detachment of the flow of the medium partial flow from the channel walls of the measuring channel. Furthermore, the inlet area of the main channel is provided in the area of its opening which faces toward the main flow direction with inclined or curved surfaces, which are designed in such a way that medium flowing into the inlet area is guided away from the part of the main channel which leads to the sensor chip. This has the effect that, due to their mass inertia, liquid or solid particles contained in the medium may not reach the sensor chip and soil it.

Such hot-film airflow sensors have to meet a variety of requirements and boundary conditions in practice. In addition to the goal of reducing a pressure drop at the hot-film airflow sensor overall by way of suitable fluidic embodiments, one of the primary challenges is to further improve the signal quality and the robustness of such devices in relation to contamination by oil and water droplets and soot, dust, and other solid particles. This signal quality relates, for example, to a mass flow of the medium through the measuring channel leading to the sensor chip and possibly also to the reduction of a signal drift and the improvement of the signal-to-noise ratio. The signal drift relates to the deviation, for example, of the mass flow of the medium in a sense of a change of the characteristic curve relationship between the actually occurring mass flow and the signal to be output which is ascertained within the scope of the calibration during the manufacture. For the ascertainment of the signal-to-noise ratio, the sensor signals output in rapid chronological sequence are considered, while in contrast the characteristic curve drift or signal drift relates to a change of the mean value.

In typical hot-film airflow sensors of the described type, a sensor carrier having a sensor chip attached or introduced thereon generally protrudes into the measuring channel. For example, the sensor chip may be glued into the sensor carrier or glued thereon. The sensor carrier may form a unit, for example, with a bottom plate made of metal, on which electronics may also be glued, a control and evaluation circuit in the form of a circuit board. For example, the sensor carrier may be designed as an injection-molded plastic part of an electronics module. The sensor chip and the control and evaluation circuit may be connected to one another by bond connections, for example. The electronics module created in this way may be glued into a sensor housing, for example, and the entire plug-in sensor may be sealed using covers.

In spite of the improvements caused by this sensor arrangement, there is still a potential for improvement with respect to the signal detection accuracy.

In order that the hot-film airflow sensor may supply a preferably low-interference air mass signal, a preferably uniform inflow to the plug-in sensor and through the measuring channel therein and in particular over the measuring surface of the sensor chip is important. A gap, whose width is subjected to manufacturing variations, exists between an end face of the sensor carrier and the wall of the measuring channel. The fluid medium flowing into the measuring channel divides into three partial mass flows in the area of the sensor carrier. A first partial mass flow flows above the sensor carrier and the sensor chip, a second partial mass flow flows below the sensor carrier, and a third partial mass flow flows through the gap. After the flow around the sensor carrier, an unstable wake having varying flow velocities and pressures forms. This has the result that varying flow variables also result upstream, in particular in the area of the sensor chip, which result in variations in the measuring signal, in particular with oscillation modes typical for the dimension of the sensor carrier and the flow velocity. This effect also results with an asymmetrical design of the walls of the measuring channel. Conventional sensor carriers are symmetrically designed and promote this unfavorable situation.

Therefore, a sensor arrangement is provided for determining at least one parameter of a fluid medium flowing through a measuring channel, which may at least largely avoid the disadvantages of known methods and strategies and in which in particular the characteristic curve reproducibility and the comparability are improved and the signal noise and the inflow sensitivity are reduced.

The sensor arrangement for determining at least one parameter of a fluid medium flowing through a measuring channel, in particular an intake air mass flow of an internal combustion engine, includes a sensor housing, in particular a plug-in sensor which is introduced or may be introduced into a flow tube, in which the measuring channel is formed, and at least one sensor chip, which is situated in the measuring channel, for determining the parameter of the fluid medium. The sensor chip is attached to a sensor carrier protruding into the measuring channel. The sensor carrier is designed in such a way that it has a chord. The chord has a length of 4.5 mm to 6.5 mm.

The sensor carrier may have an inflow section upstream from the sensor chip and an outflow section downstream from the sensor chip with respect to a main flow direction of the fluid medium in the measuring channel. The outflow section may be formed at least partially rounded or at least partially wedge-shaped. The sensor carrier may be designed in such a way that it has an asymmetrical cross section with respect to the chord in the outflow section. The sensor carrier may have an upper side and a lower side opposite thereto. The sensor chip may be situated on the upper side. A distance of the upper side to the chord may be greater than a distance of the lower side to the chord. The sensor carrier may include at least one segmentation. The sensor carrier may include at least one projection. The projection may be cascaded, for example. The sensor carrier may have a leading edge on an upstream end and a trailing edge on a downstream end. The leading edge and/or the trailing edge may include at least one recess. The recess may be triangular, semicircular, rectangular, and/or sinusoidal. The sensor carrier may extend in an extension direction in the measuring channel. The extension direction may be essentially perpendicular to the main flow direction of the fluid medium into the measuring channel. The sensor carrier may taper in the extension direction. The sensor carrier may taper symmetrically or asymmetrically in the extension direction.

The main flow direction is to be understood within the scope of the present invention as the local flow direction of the fluid medium at the location of the sensor or the sensor arrangement, with local irregularities, for example, turbulences, being able to remain unconsidered. In particular, the main flow direction may therefore be understood as the local average transport direction of the flowing fluid medium. The main flow direction may therefore be related, on the one hand, to the flow direction at the location of the sensor arrangement itself or also to the flow direction in the channel inside the sensor housing, for example, at the location of the sensor carrier or the sensor chip, both mentioned flow directions being able to differ. Within the scope of the present invention, it is therefore always specified to which location the main flow direction relates. If no more detailed specification is made, the main flow direction relates to the location of the sensor arrangement.

A downstream arrangement is to be understood within the scope of the present invention as the arrangement of a component at a point which the fluid medium flowing in the main flow direction reaches chronologically later than a reference point.

Similarly, within the scope of the present invention, an upstream arrangement of a component is to be understood as an arrangement of the component at a point which the fluid medium flowing in the main flow direction reaches chronologically earlier than a reference point.

Within the scope of the present invention, the sensor carrier may be designed entirely or partially as a circuit carrier, in particular as a circuit board, or may be part of a circuit carrier, in particular a circuit board. For example, the circuit carrier, in particular the circuit board, may have an extension which forms the sensor carrier and which protrudes into the channel, for example, the measuring channel of a hot-film airflow sensor. The remaining part of the circuit carrier, in particular of the circuit board, may be housed, for example, in an electronics chamber, in a housing of the sensor arrangement or of a plug-in sensor of the sensor arrangement.

A circuit board is to be understood within the scope of the present invention in general as an essentially plate-shaped element, which may be used as a carrier of electronic structures, for example, strip conductors, terminal contacts, or the like and preferably includes one or more such structures. At least slight deviations from the plate shape also fundamentally come into consideration and are also to be included in the concept. The circuit board may be manufactured, for example, from a plastic material and/or a ceramic material, for example, an epoxy resin, in particular a fiber-reinforced epoxy resin. In particular, the circuit board may be designed, for example, as a circuit board having strip conductors, in particular printed strip conductors.

In this way, the electronics module of the sensor arrangement may be greatly simplified and a bottom plate and a separate sensor carrier may be omitted, for example. A bottom plate and sensor carrier may be replaced by a single circuit board, on which, for example, a control and evaluation circuit of the sensor arrangement may also be entirely or partially situated. This control and evaluation circuit of the sensor arrangement is used to control the at least one sensor chip and/or to evaluate the signals generated by this sensor chip. In this way, by combining the mentioned elements, the manufacturing expenditure for the sensor arrangement may be substantially reduced and the installation space requirement for the electronics module may be greatly decreased.

The sensor arrangement may in particular include at least one housing, the channel being formed in the housing. For example, the channel may include a main channel and a bypass channel or measuring channel, the sensor carrier and the sensor chip being able to be situated in the bypass or measuring channel, for example. Furthermore, the housing may include an electronics chamber separate from the bypass channel, the electronics module or the circuit board being essentially accommodated in the electronics chamber. The sensor carrier may be formed as an extension of the circuit board protruding into the channel. This arrangement is technically comparatively simple to implement, in contrast to the complex electronics modules which are known from the related art.

In particular, in the case in which a circuit board is used as a sensor carrier, but also in other cases and/or using other media as the sensor carrier, the sensor carrier may be designed at least partially as a multilayered sensor carrier. The sensor carrier may thus be manufactured using a so-called multilayer technology and may include two or more carrier layers which are connected to one another. For example, these carrier layers may in turn be manufactured from a metal, a plastic, or a ceramic material or a composite material and may be connected to one another by joining techniques, for example, gluing.

In this case, in which a multilayer technology is used having multiple sensor layers of the sensor carrier, the leading edge may be designed to be at least partially cascaded by a differing dimensioning of the carrier layers toward the main flow direction of the fluid medium. In this way, the profiles may be implemented as at least approximately cascaded. For example, in this way, rectangular or—approximated by a stepped shape—at least approximately round, rounded, or wedge-shaped molded profiles may be formed in a sectional plane perpendicular to the extension plane of the sensor carrier. The sensor chip may be situated on or in the sensor carrier in such a way that it is aligned perpendicularly to the local main flow direction. For example, the sensor chip may be designed to be rectangular, one side of this rectangle being situated perpendicularly or essentially perpendicularly, for example, having an alignment which deviates by not more than 10° from the perpendicular, to the local main flow direction.

The sensor chip may be electrically contacted via at least one electrical connection. For example, the sensor carrier, in particular a circuit board forming the sensor carrier or an extension of this circuit board, may include one or multiple strip conductor(s) and/or contact pad(s), which are connected to corresponding contacts on the sensor chip, for example, by a bonding method. In this case, the electrical connection may be protected by at least one cover and may be separated from the fluid medium. This cover may be designed in particular as a so-called glob top, for example, as a plastic drop and/or adhesive drop, which covers the electrical connection, for example, the bond wires. In this way, influences of the flow by the electrical connection may also be reduced in particular, since the glob top has a smooth surface.

Furthermore, the sensor chip may include at least one sensor area. This sensor area may be, for example, a sensor surface made of, for example, a porous ceramic material and/or in particular a sensor diaphragm. The flowing fluid medium may be able to flow over the sensor diaphragm as the measuring surface or sensor area. The sensor chip includes, for example, at least one heating element and at least two temperature sensors, which are situated, for example, on the measuring surface of the sensor chip, one temperature sensor being mounted upstream from the heating element and the other temperature sensor being mounted downstream from the heating element. A mass flow and/or volume flow of the fluid medium may be inferred from an asymmetry of the temperature profile captured by the temperature sensors, which is influenced by the flow of the fluid medium.

An inflow section of the sensor carrier is to be understood within the scope of the present invention as the section of the sensor carrier which is located upstream from the sensor chip.

Similarly, an outflow section of the sensor carrier is to be understood within the scope of the present invention as the section of the sensor carrier which is located downstream from the sensor chip.

A chord is to be understood within the scope of the present invention as an imaginary connecting line of the sensor carrier between its leading edge and the trailing edge. The leading edge is the edge of the sensor carrier which is located upstream and faces toward the incoming air. The trailing edge is accordingly the edge facing away from the incoming air.

A segmentation is to be understood within the scope of the present invention as an interrupted formation of a component. The component is therefore made of segments.

A basic concept of the present invention is the formation of a reduced running length of the sensor carrier in accordance with the second Stokes problem and an aerodynamically more favorable inflow of the sensor carrier with a backflow having a reduced pulsation error. Thus, for example, sensor carrier cross sections which are rounded, rounded in partial areas, or wedge-shaped in sections in the area of the sensor carrier trailing edge ensure a geometrically defined detachment in the case of a forward flow and an aerodynamically favorable inflow, in combination with a substantially detachment-free flow over the sensor chip in the case of a backflow. An asymmetrical embodiment of the sensor carrier in the area of the sensor carrier trailing edge results in a reduction of the fluctuating wake and varying detachment areas on one or both sides in the bypass channel, for the increase of the permissible attack angle range as a result of the effective profile curve, and for the increase of the characteristic curve reproducibility and reduction of the signal noise. A segmentation of the sensor carrier causes a structuring of the flow over the sensor carrier. On the side of the sensor chip, an additional formation of a surface which is elevated in relation to the base cross section, having a set-back step, for example, in the form of a spoiler, ensures a geometrically defined, stable detachment on the side of the sensor chip. Triangular, semicircular, rectangular, and/or sinusoidal recesses of the sensor carrier leading and/or trailing edge cause a flow structuring both in the case of forward flow and also reverse flow.

DETAILED DESCRIPTION

Figure 1:
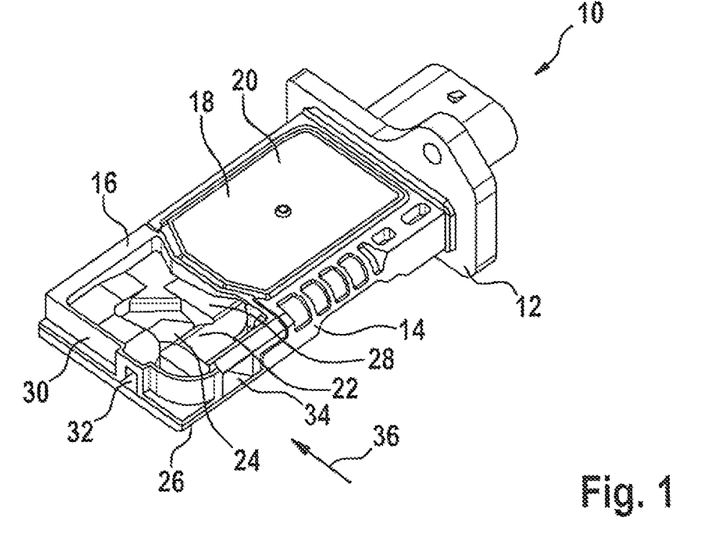
FIG. 1 shows a perspective view of a sensor arrangement.

FIG. 1 shows a perspective view of a sensor arrangement 10 for determining a parameter of a fluid medium. Sensor arrangement 10 is designed as a hot-film airflow sensor and includes a sensor housing 12 designed as a plug-in sensor, which may be plugged, for example, into a flow tube, in particular an intake manifold of an internal combustion engine. Sensor housing 12 includes a housing body 14, a measuring channel cover 16, an electronics chamber 18, and an electronics chamber cover 20 for closing electronics chamber 18. A channel structure 22 is formed in measuring channel cover 16. Channel structure 22 has a main channel 24 which opens into a main flow outlet (not shown) on lower side 26 in relation to the illustration in FIG. 1 of sensor housing 12, and a bypass or measuring channel 28, which branches off from main channel 24 and which opens into a bypass or measuring channel outlet 32 situated on an end face 30 of sensor housing 12. A representative quantity of the fluid medium may flow through channel structure 22 via an inlet opening 34, which faces opposite to a main flow direction 36 of the fluid medium at the location of sensor housing 12 in the inserted state.

Figure 2:
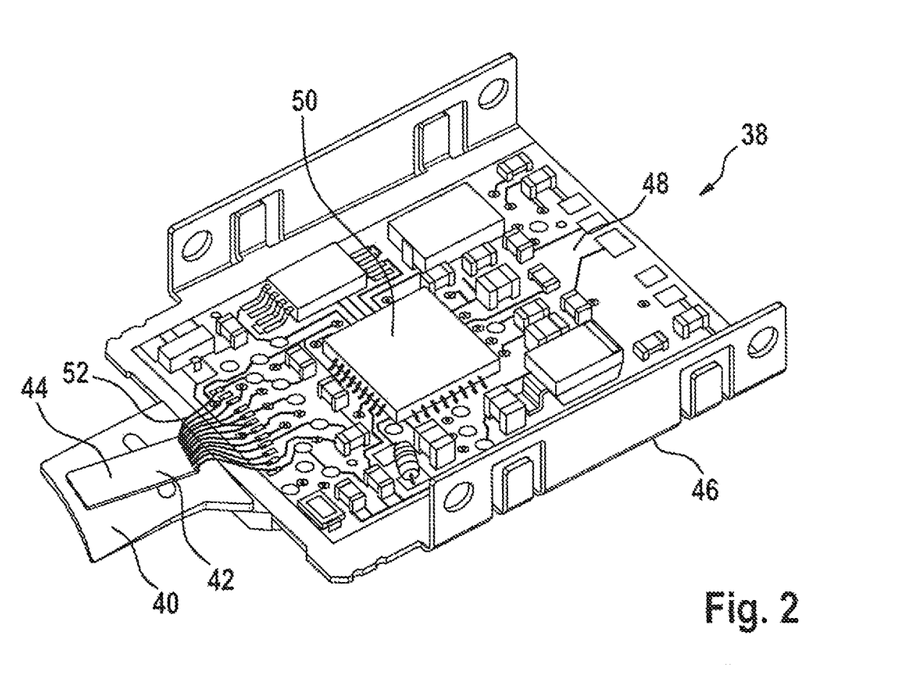
FIG. 2 shows an enlarged view of an electronics module of the sensor arrangement.

FIG. 2 shows an enlarged illustration of an electronics module 38 of sensor arrangement 10. In an inserted state of electronics module 38, a sensor carrier 40 protrudes into measuring channel 28. A sensor chip 42 is incorporated into this sensor carrier 40 in such a way that the fluid medium may flow over a micromechanical sensor diaphragm 44, which is formed as a sensor area of sensor chip 42. Sensor carrier 40 is part of electronics module 38 with sensor chip 42.

Electronics module 38 furthermore has a curved bottom plate 46 and a circuit board 48 which is attached thereon, for example, glued on, including a control and evaluation circuit 50. Sensor chip 42 is electrically connected to control and evaluation circuit 50 via electrical connections 52, which are designed here as wire bonding. Electronics module 38 thus created is introduced, for example, glued, into electronics chamber 18 in housing body 14 of sensor housing 12. Sensor carrier 40 protrudes into channel structure 22. Subsequently, electronics chamber 18 is closed by electronics chamber cover 20.

Figure 3:
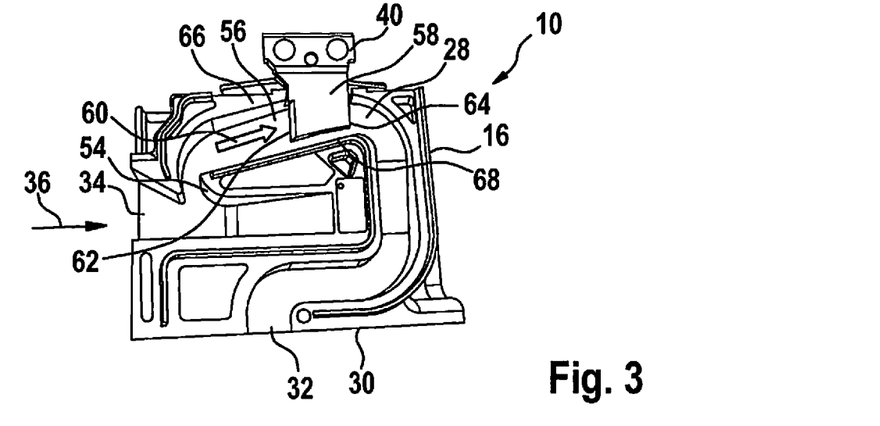
FIG. 3 shows a top view of the measuring channel cover including the measuring channel and the sensor carrier.

FIG. 3 shows a top view of channel structure 22 in measuring channel cover 16. A centrifugal force deflector 54 is situated in measuring channel cover 16. Measuring channel cover 16 is furthermore designed in such a way that a measuring channel ramp 56 is formed in measuring channel 28. Furthermore, the arrangement of sensor carrier 40 is apparent from FIG. 3. Sensor carrier 40 protrudes into measuring channel 28 in an inserted state. In the view of FIG. 3, rear or lower side 58 of sensor carrier 40 is apparent. Rear or lower side 58 is the side of sensor carrier 40 opposite to sensor diaphragm 44. Sensor carrier 40 furthermore includes a front edge or leading edge 62, which faces toward a main flow direction 60 of the fluid medium in measuring channel 28, and which may be rounded, and a trailing edge 64 opposite downstream from leading edge 62. Measuring channel ramp 56 extends in the area between centrifugal force deflector 54 and trailing edge 64 of sensor carrier 40. Measuring channel ramp 56 may optionally extend up to an area downstream from trailing edge 64 of sensor carrier 40. Measuring channel 28 is delimited at least in the area of sensor chip 42 by housing body 14, measuring channel cover 16, a wall section 66 facing toward the electronics chamber, and a wall section 68 facing away from the electronics chamber.

Figure 4:
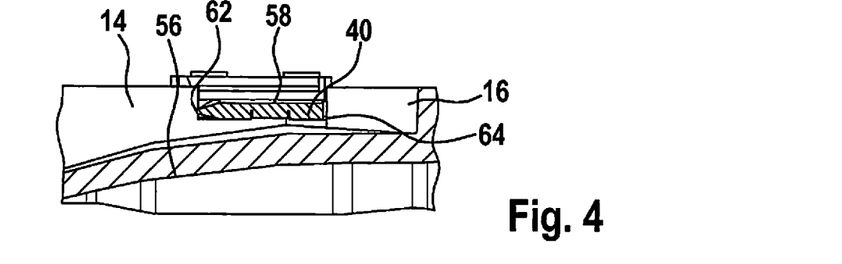
FIG. 4 shows a cross-sectional view of the measuring channel cover.

FIG. 4 shows a cross-sectional view of measuring channel cover 16, the section also extending through sensor carrier 40. It is apparent from the view of FIG. 4 that the flow cross section in measuring channel 28 becomes smaller and smaller with increasing running length due to measuring channel ramp 56, which, together with a cross-sectional reduction caused by sensor carrier 40, results in an acceleration of the flow and a reduction of the oscillation component of the flowing fluid medium. A flattening or a formation of measuring channel ramp 56 approximately in parallel to sensor carrier 40 in the area of trailing edge 64 of sensor carrier 40 is very well apparent.

Figure 5:
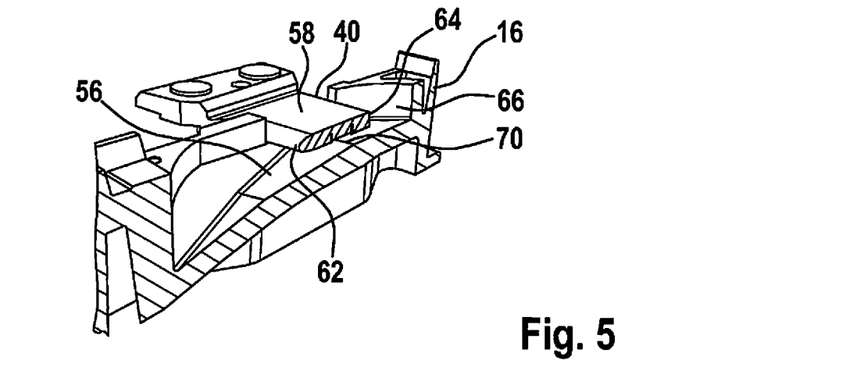
FIG. 5 shows a perspective cross-sectional view of the measuring channel cover.

FIG. 5 shows a perspective cross-sectional view of measuring channel cover 16 in the area of sensor carrier 40. A gap 70 is apparent between the side of sensor carrier 40 in which sensor chip 42 is incorporated with sensor diaphragm 44, and measuring channel ramp 56. A partial flow of the fluid medium flowing inside measuring channel 28 flows through this gap 70. Furthermore, it is apparent from FIG. 5 that guiding and conditioning of the flowing fluid medium are decisively influenced by measuring channel ramp 56 and sensor carrier 40.

Figure 6:
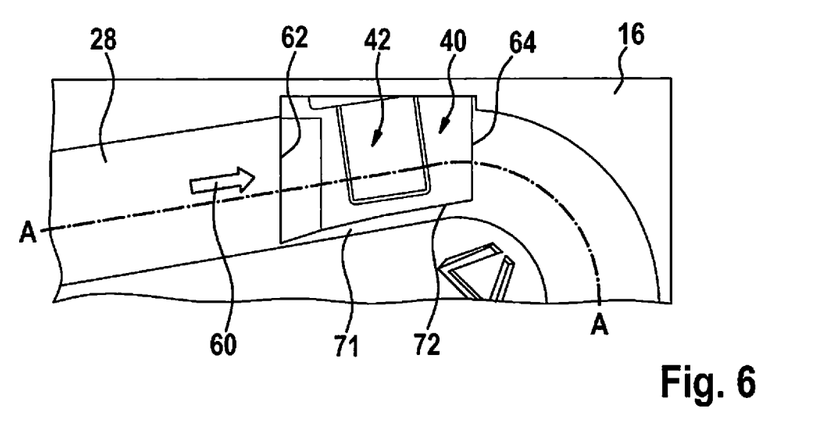
FIG. 6 shows a view of the arrangement of the sensor carrier in the measuring channel cover and the measuring channel.

FIG. 6 shows an arrangement of sensor carrier 40 in measuring channel cover 16 and more specifically in measuring channel 28. In particular, FIG. 6 shows the unmodified geometrical relationships in measuring channel 28 in the area of sensor carrier 40. Sensor chip 42 is located on the rear side of sensor carrier 40 in this view. In normal operation, i.e., in the case of a forward flow from the air filter to the engine, the air passes over sensor carrier 40 on the sides facing toward and away from sensor chip 42 and in a gap 71 between an end face 72 of sensor carrier 40 and the opposing channel wall of measuring channel 28. After sensor carrier 40, a curve of measuring channel 28 follows. Gap 71, whose width is subjected to variations during manufacturing, exists between end face 72 of sensor carrier 40 and the wall of measuring channel 28. The mass flow in measuring channel 28 is accordingly divided into partial mass flows above sensor carrier 40, below sensor carrier 40, and through gap 71.

Figure 7:
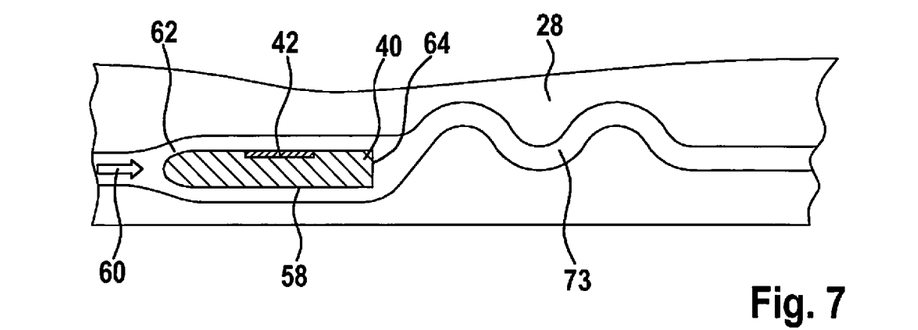
FIG. 7 shows a cross-sectional view along line A-A of FIG. 6.

FIG. 7 shows a cross-sectional view of measuring channel cover 16 along line A-A of FIG. 6. One possible flow situation is shown. After the flow around sensor carrier 40, an unstable wake 73 forms, having varying velocities and pressures. This has the result that varying flow variables also result upstream, in particular in the area of sensor chip 42, which result in variations in the measuring signal. This effect results in spite of a symmetrical design of the walls of measuring channel 28. A conventional sensor carrier 40 is symmetrically designed and therefore promotes unfavorable flow situations.

Figure 8:
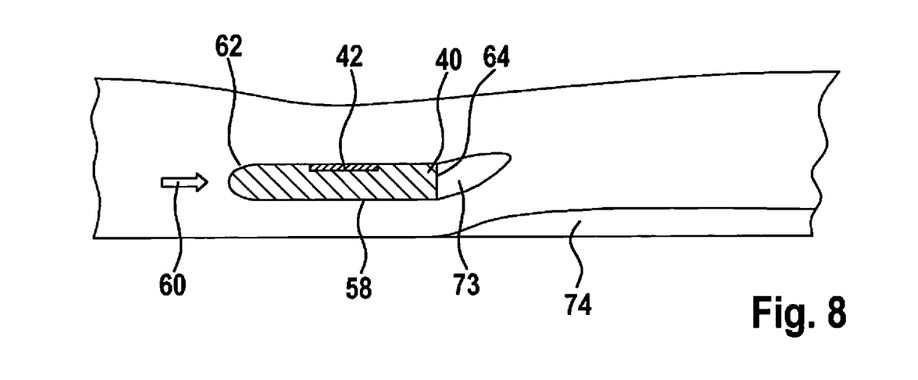
FIG. 8 shows a view of flow conditions on the basis of the design of FIG. 7.

FIG. 8 shows a further cross-sectional view of measuring channel cover 16 along line A-A in FIG. 6. A further possible flow formation is shown in FIG. 8. In this situation, in addition to existing fluctuating wake region 73, which is shown in FIG. 7, after sensor carrier 40 or downstream from sensor carrier 40 with respect to main flow direction 60 in measuring channel 28, a detachment and recirculation region 74 arises on the wall of measuring channel 28. Due to the sudden changes of the cross section of measuring channel 28 at the height of trailing edge 64 of sensor carrier 40, a slow-down of the flow results in conjunction with a pressure increase. As a result of the pressure increase and the friction forces on the channel walls, the flow finally detaches from one or both channel walls. Such a pressure-induced detachment is typically not stable with respect to location or time. The detachment point from the wall, i.e., the initial removal of the flow lines which are parallel to the wall up to that point, the thickness, i.e., the extension of the so-called detachment bubble into the core flow region, and also the length of the detachment bubble, vary. The detachment interacts with the immediate wake of sensor carrier 40. As a result of the divergence of the wall, which is located on top in FIG. 8, of measuring channel 28 and the dynamically fanning wake flow of sensor carrier 40, it may finally even occur that detachment region jumps to the other wall, which is shown on top in FIG. 8, of measuring channel 28. With respect to the pulsation properties, both the relatively large running length of the flow on the side facing toward sensor chip 42 and also the sensor carrier rear wall, which has an inflow at an approximately 90° angle in the case of a reverse flow, are disadvantageous.

Figure 9:
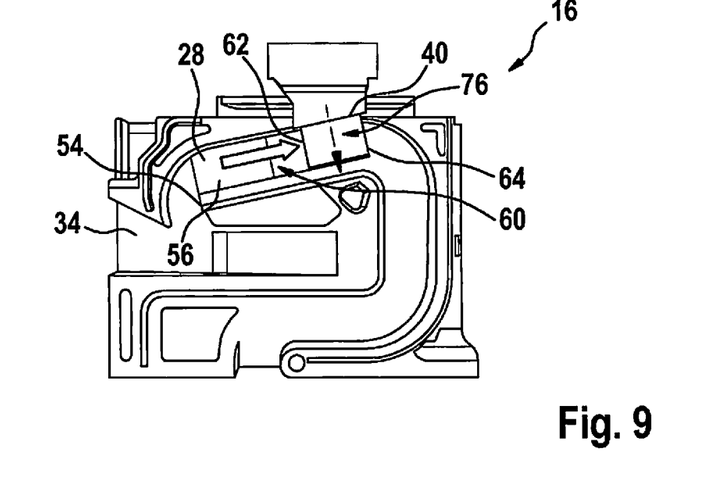
FIG. 9 shows a top view of the measuring channel cover according to a first specific embodiment of the present invention.

FIG. 9 shows a top view of measuring channel cover 16 according to a first specific embodiment of the present invention. Sensor carrier 40 extends along an extension direction 76 in measuring channel 28. Extension direction 76 is essentially perpendicular to main flow direction 60 of the fluid medium in measuring channel 28.

Figure 10:
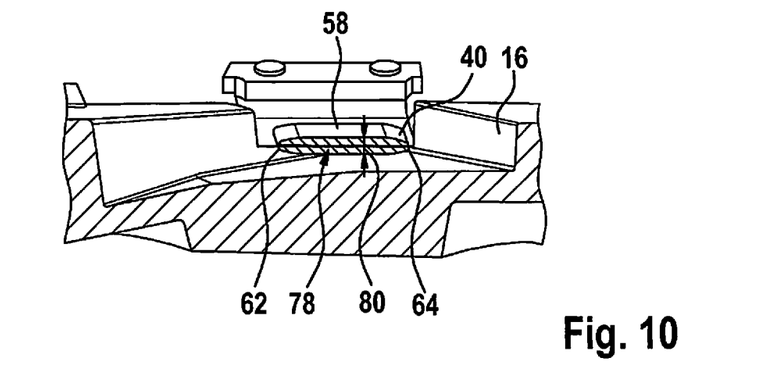
FIG. 10 shows a cross-sectional view of the measuring channel cover according to the first specific embodiment.

FIG. 10 shows a cross-sectional view of measuring channel cover 16 according to the first specific embodiment. Sensor carrier 40 has a chord 78. Chord 78 has a length of 4.5 mm to 6.5 mm, for example, 5.5 mm. Accordingly, sensor carrier 40 is formed substantially shorter, viewed in main flow direction 60 of the fluid medium in measuring channel 28, than conventional sensor carriers, whose chord has a length of at least 7.0 mm. A thickness 80 of the cross section of sensor carrier 40 may be from 0.5 mm to 3.0 mm, for example, 1.0 mm. In contrast to the conventional specific embodiment, the specific embodiment shown in FIG. 10 has a rounded trailing edge 64. Therefore, sensor carrier 40 in the first specific embodiment has a rounded front edge or leading edge 62 and also a rounded trailing edge 64. Sensor carrier 40 is thus designed in the form of a double ellipse.

Figure 11:
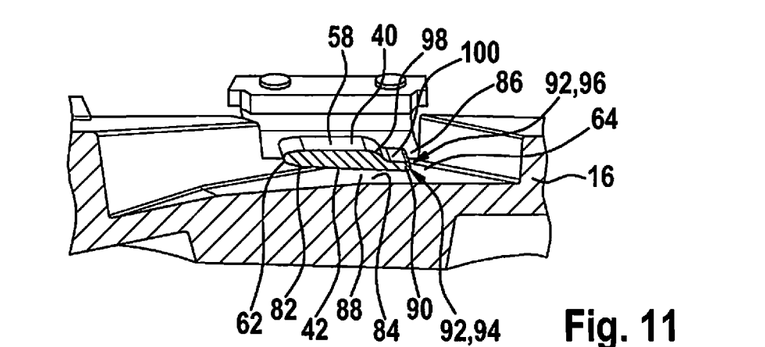
FIG. 11 shows a cross-sectional view of the measuring channel cover according to a second specific embodiment of the present invention.

FIG. 11 shows a cross-sectional view of measuring channel cover 16 according to a second specific embodiment. Only the differences from the preceding specific embodiment are described hereafter and identical components are provided with identical reference numerals.

Sensor carrier 40 has, with respect to main flow direction 60 of the fluid medium in measuring channel 28, an inflow section 82 upstream from sensor chip 42 and an outflow section 84 downstream from sensor chip 42. Outflow section 84 is formed at least partially rounded or at least partially wedge-shaped. In the exemplary embodiment shown, outflow section 84 is designed in the form of a diving board 86. Sensor carrier 40 accordingly has, on the side of sensor chip 42, i.e., upper side 88, in the continuation of the level surface in the area of sensor chip 42, a narrow cross section 90, whose edges 92 may be provided in this embodiment with radii at 94, 96 of different sizes. On lower side 58, which faces away from sensor chip 42, in contrast, the contour is set back via two radii 98, 100 in the direction of upper side 88 and is also provided with a radius at trailing edge 64. Presently, radii down to a minimum of 0.1 mm may be implemented in the micro-injection molding process. Larger radii in the area of trailing edge 64 having values up to 2 mm and radii in the area of the set-back contour of lower side 58 having values of 0.1 mm to 10 mm are conceivable.

Figure 12:
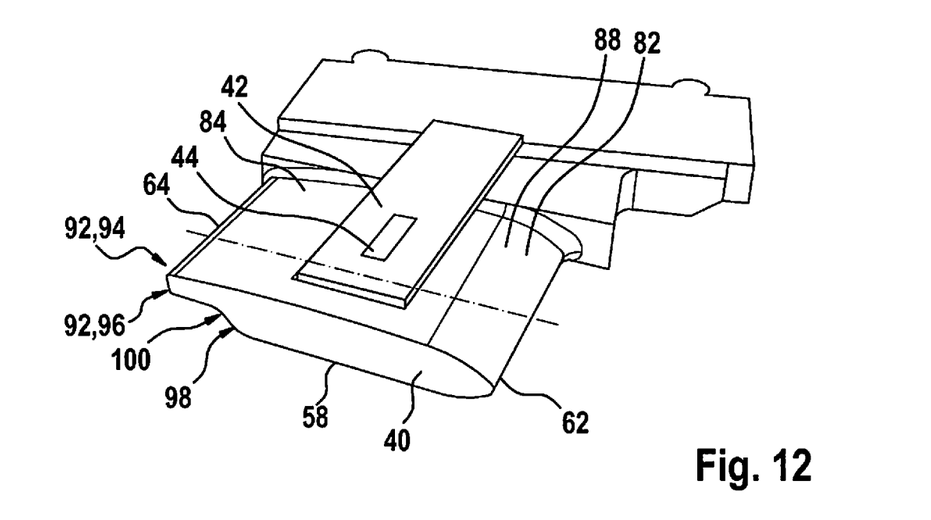
FIG. 12 shows a perspective view of the sensor carrier according to the second specific embodiment.

FIG. 12 shows a perspective view of sensor carrier 40 according to the second specific embodiment. In particular, the diving-board-like design of outflow section 84 is apparent. Various radii 94, 96, 98, 100 of the cross-sectional contour are also apparent.

Figure 13:
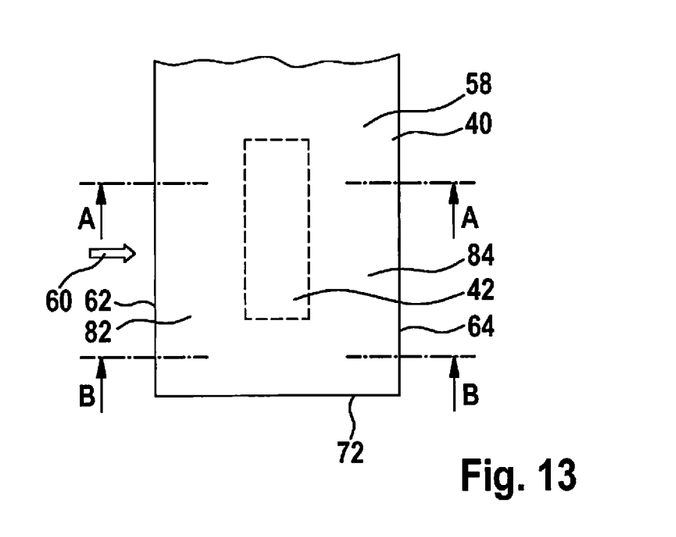
FIG. 13 shows a bottom view of the measuring channel cover according to a third specific embodiment of the present invention.

FIG. 13 shows a bottom view of a sensor carrier 40 according to a third specific embodiment. Only the differences from the preceding specific embodiments are described hereafter and identical components are provided with identical reference numerals. The location of sensor chip 42 on upper side 88 of sensor carrier 40 is indicated.

Figure 14:
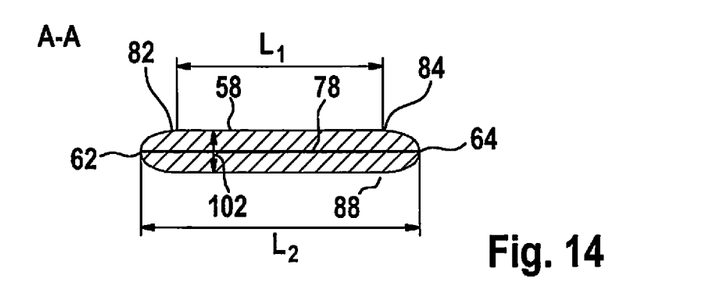
FIG. 14 shows a cross-sectional view of the sensor carrier along line A-A of FIG. 13.

FIG. 14 shows a cross-sectional view of sensor carrier 40 along line A-A of FIG. 13. In sensor carrier 40 of the third specific embodiment, outflow section 84 is formed symmetrically with respect to chord 78.

Figures 15, 16:
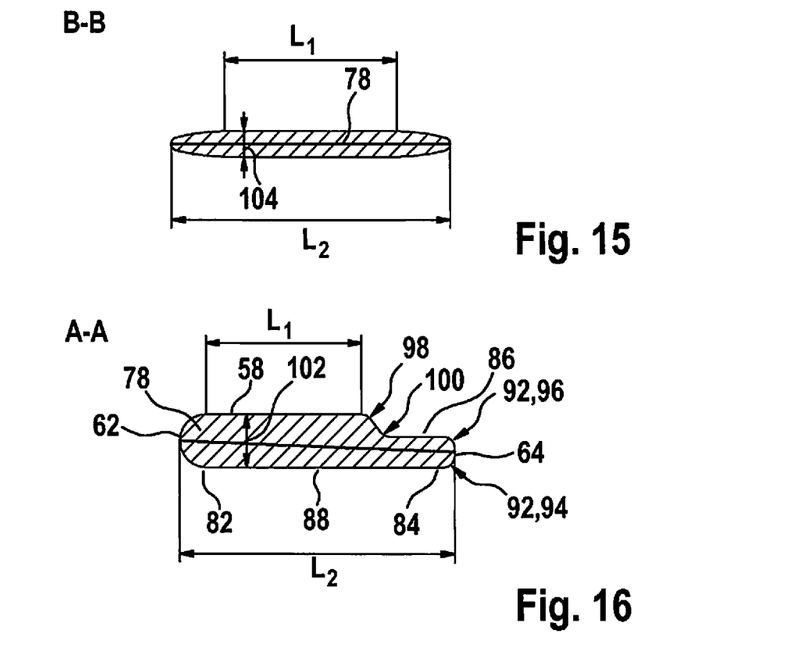
FIG. 15 shows a cross-sectional view of the sensor carrier along line B-B of FIG. 13.
FIG. 16 shows a cross-sectional view of the sensor carrier along line A-A of FIG. 13 according to a fourth specific embodiment.

FIG. 15 shows a cross-sectional view of sensor carrier 40 along line B-B of FIG. 13. In sensor carrier 40 of the third specific embodiment, outflow section 84 is formed symmetrically with respect to chord 78. However, sensor carrier 40 has a greater thickness in the area of sensor chip 42 than in the remaining areas. This special design is noticeable upon examination of the cross sections along lines A-A and B-B of FIG. 13. Sensor carrier 40 thus has a greater thickness 102 along line A-A of FIG. 13 in comparison to thickness 104 along line B-B of FIG. 13.

FIG. 16 shows a cross-sectional view of a sensor carrier 40 according to a fourth specific embodiment. Only the differences from the preceding specific embodiments are described hereafter and identical components are provided with identical reference numerals. The section extends along line A-A of FIG. 13. The location of sensor chip 42 on upper side 88 of sensor carrier 40 is indicated. The fourth specific embodiment is based on the second specific embodiment and combines details of the third specific embodiment. The design of sensor carrier 40 having diving board 86 on outflow section 84 and radii 92, 94, 98, 100 formed thereon of the cross-sectional contour are apparent.

Figure 17:
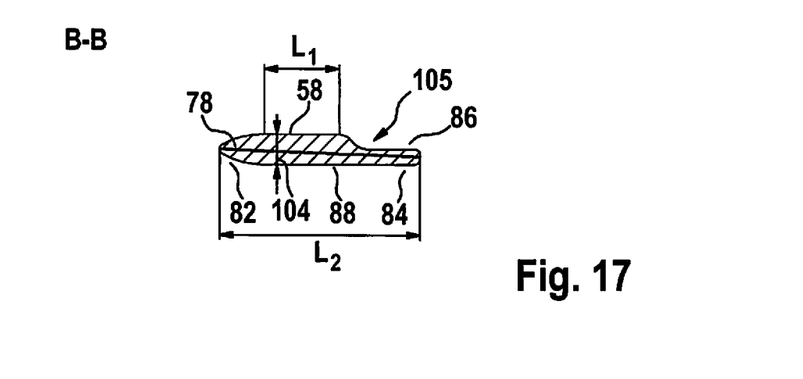
FIG. 17 shows a cross-sectional view of the sensor carrier along line B-B of FIG. 13 according to the fourth specific embodiment.

FIG. 17 shows a cross-sectional view of sensor carrier 40 along line B-B of FIG. 13. Sensor carrier 40 has a greater thickness in the area of sensor chip 42 than in the remaining areas. This special design is noticeable upon examination of the cross sections along lines A-A and B-B of FIG. 13 for the fourth specific embodiment. Thus, sensor carrier 40 has a greater thickness 102 along line A-A of FIG. 13 for the fourth specific embodiment in comparison to thickness 104 along line B-B of FIG. 13 for the fourth specific embodiment. The transition from lower side 58 to diving board 86 may also be designed in the form of a spline 105.

Figure 18:
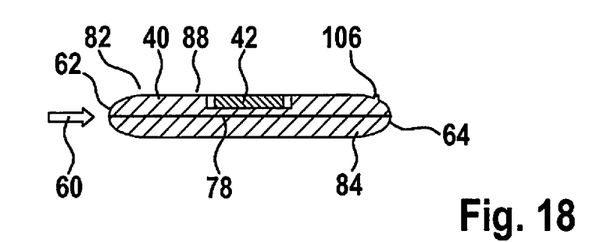
FIG. 18 shows a cross-sectional view of a sensor carrier according to a fifth specific embodiment.

FIG. 18 shows a cross-sectional view of a sensor carrier 40 according to a fifth specific embodiment. A projection 106 is situated on the upper side of sensor carrier 40. FIG. 18 shows a cross-sectional view of a sensor carrier 40 according to a fourth specific embodiment. Only the differences from the preceding specific embodiments are described hereafter and identical components are provided with identical reference numerals. In sensor carrier 40 of the third specific embodiment, outflow section 84 is designed symmetrically with respect to chord 78. Sensor carrier 40 has a projection 106 on outflow section 84. Projection 106 is located on trailing edge 64 and protrudes therefrom in the direction of upper side 88.

Figure 19:
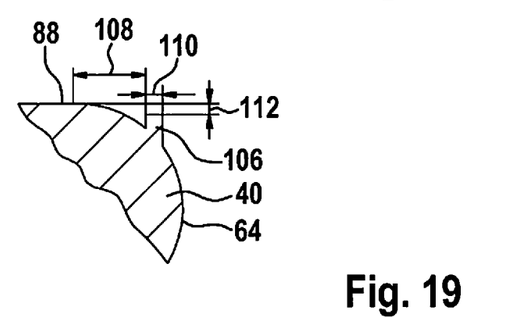
FIG. 19 shows an enlarged cross-sectional view of the sensor carrier of the fifth specific embodiment.

FIG. 19 shows an enlarged cross-sectional view of sensor carrier 40 of the fifth specific embodiment. Projection 106 is apparent. Projection 106 is cascaded, so that projection 106 has a rectangular cross-section. Projection 106 has a distance 108 of 0.5 mm to 2.0 mm from sensor chip 42 in main flow direction 60 in measuring channel 28, for example, 1.0 mm. Projection 80 has a width 110 of 0.1 mm to 0.4 mm, for example, 0.2 mm. Projection 106 is situated at a distance 112 of −0.2 mm to 0.4 mm, for example, 0.1 mm, from the level of upper side 88 or sensor chip 42. Projection 106 does not necessarily have to have a rectangular cross-section. Other cross-sectional shapes, for example, triangular, polygonal, or rounded, are also possible.

Figure 20:
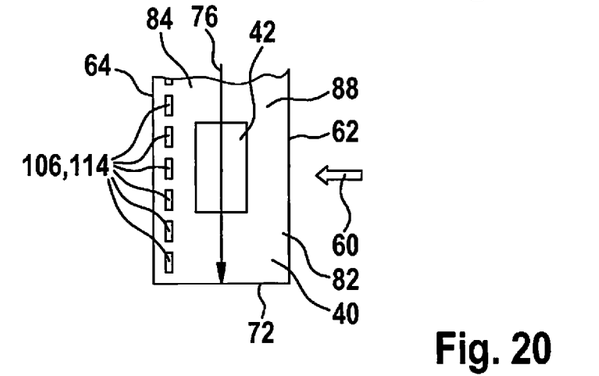
FIG. 20 shows a top view of a sensor carrier according to a sixth specific embodiment.

FIG. 20 shows a top view of a sensor carrier 40 according to a sixth specific embodiment. Only the differences from the preceding specific embodiments are described hereafter and identical components are provided with identical reference numerals. In the sixth specific embodiment, projection 106 is formed as a segmentation 114. In other words, projection 106 has multiple interruptions, so that projection 106 is made of multiple segments situated in series, which are situated downstream with respect to main flow direction 60 in measuring channel 28 of sensor chip 42 and are situated in parallel to extension direction 76.

Figure 21:
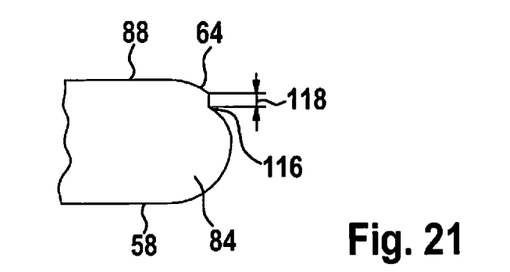
FIG. 21 shows a side view of a sensor carrier according to a seventh specific embodiment.

FIG. 21 shows a side view of a sensor carrier 40 according to a seventh specific embodiment. Only the differences from the preceding specific embodiments are described hereafter and identical components are provided with identical reference numerals. In the seventh specific embodiment, sensor carrier 40 has a notch or recess 116 on trailing edge 64 instead of projection 106. Recess 116 has a height 118 of 0.1 mm to 0.25 mm, for example, 0.15 mm. Recess 116 extends over the entire length of trailing edge 64 in extension direction 76. Alternatively, recess 116 only extends over a part of trailing edge 64.

Figure 22:
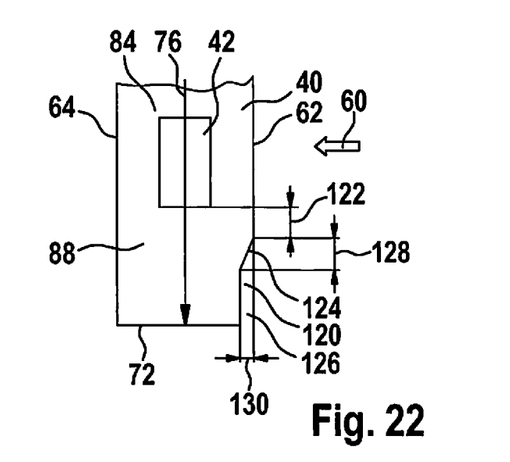
FIG. 22 shows a top view of a sensor carrier according to an eighth specific embodiment.

FIG. 22 shows a top view of a sensor carrier 40 according to an eighth specific embodiment. Only the differences from the preceding specific embodiments are described hereafter and identical components are provided with identical reference numerals. In the eighth specific embodiment, leading edge 62 has a notch or recess 120. Recess 120 does not extend over the entire length of leading edge 62 in extension direction 76, but rather is situated at a distance 122 in extension direction 76. Recess 120 is formed sin such a way that sensor carrier 40 tapers in the direction toward end face 72. Sensor carrier 40 may taper linearly over a section 124, which in turn merges into a section 126 parallel to leading edge 62. Tapering section 124 may have a dimension 128 in extension direction 76 of 0.5 mm to 5.0 mm, for example, 2.0 mm. Recess 120 may have a depth 130 of 0.5 mm to 3.5 mm, for example, 1.0 mm.

Figure 23:
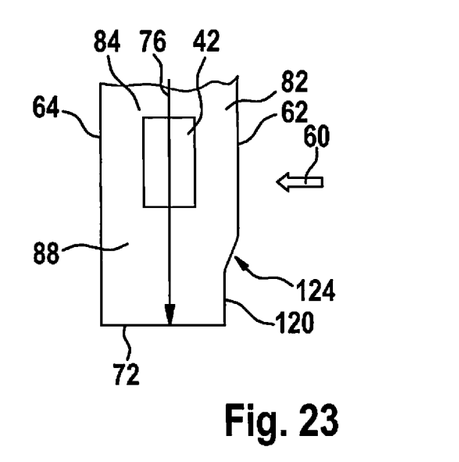
FIG. 23 shows a top view of a sensor carrier according to a ninth specific embodiment.

FIG. 23 shows a top view of a sensor carrier 40 according to a ninth specific embodiment. Only the differences from the preceding specific embodiments are described hereafter and identical components are provided with identical reference numerals. In the ninth specific embodiment, leading edge 62 also has notch or recess 120. However, section 124 does not taper linearly, but rather has a continuous curve.

Figure 24:
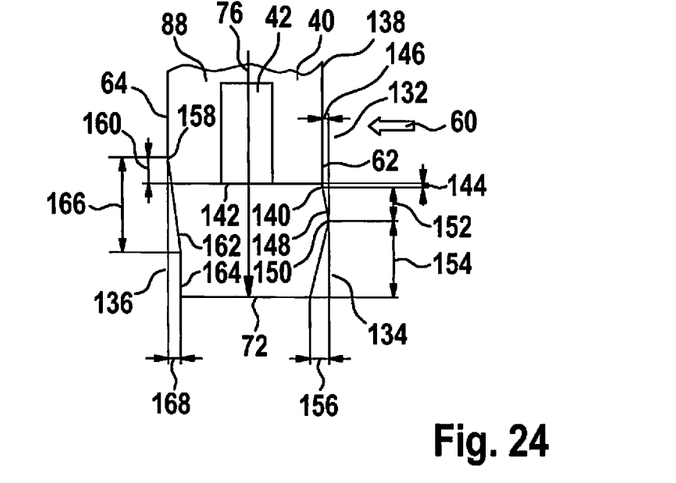
FIG. 24 shows a top view of a sensor carrier according to a tenth specific embodiment.

FIG. 24 shows a top view of a sensor carrier 40 according to a tenth specific embodiment. Only the differences from the preceding specific embodiments are described hereafter and identical components are provided with identical reference numerals. In the tenth specific embodiment, sensor carrier 40 has a first recess 132 and a second recess 134 on leading edge 62. The sensor carrier furthermore has a third recess 136 on trailing edge 64. First recess 132 extends from an end 138, which is opposite to end face 72, of sensor carrier 40 in extension direction 76 up to a point 140, which is spaced apart in the extension direction by a distance 144 of −2.0 mm to 2.0 mm, for example, −1.0 mm, from an end 142 of sensor chip 42 facing toward end face 72. First recess 132 has a depth 146 of 0.2 mm to 1.0 mm, for example, 0.5 mm. Adjacent thereto, a transition section 148 is formed, which extends linearly toward a projection 150, which faces toward main flow direction 60 in the measuring channel. Transition section 148 has a dimension 152 in extension direction 76 of 0.1 mm to 2.0 mm, for example, 0.5 mm. In extension direction 76 toward end face 72, second recess 134 adjoins projection 150, which tapers sensor carrier 40 linearly in the direction toward end face 72. Second recess 134 has a dimension 154 in extension direction 76 of 0.1 mm to 2.0 mm, for example, 0.5 mm. Second recess 134 has a depth 156 of 0.2 mm to 1.0 mm, for example, 0.5 mm, at its lowest point. Third recess 136 extends from a point 158, which is offset opposite to extension direction 76 from end 142 of sensor chip 42 facing toward end face 72 by a distance 160 of −1.0 mm to 2.0 mm, for example, 1.0 mm. Third recess 136 has a linearly tapering transition section 162 and a section 164 extending in parallel to trailing edge 64. Linearly tapering section 162 has a dimension 166 in extension direction 76 of 0.5 mm to 3.0 mm, for example, 1.5 mm. Section 164 extending in parallel to trailing edge 64 has a depth 168 of 0.2 mm to 1.5 mm, for example, 0.75 mm.

Figure 25:
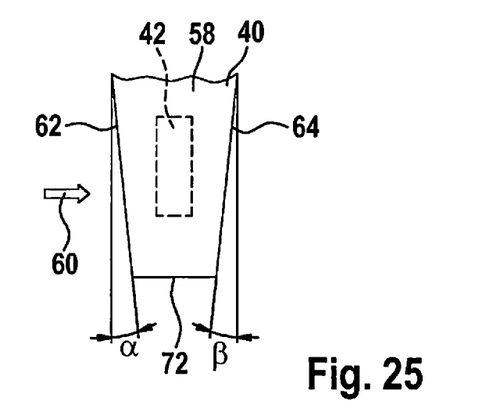
FIG. 25 shows a bottom view of a sensor carrier according to an eleventh specific embodiment.

FIG. 25 shows a bottom view of a sensor carrier 40 according to an eleventh specific embodiment. Only the differences from the preceding specific embodiments are described hereafter and identical components are provided with identical reference numerals. In the eleventh specific embodiment, sensor carrier 40 tapers in extension direction 76 toward end face 72. For example, trailing edge 64 tapers linearly at a first angle $\alpha$ of 0° to 20°, for example, 10°, and leading edge 62 tapers linearly at a second angle $\beta$ of 0° to 30°, for example, 10°. First angle $\alpha$ and second angle $\beta$ may differ in size or may be identical.

Figure 26:
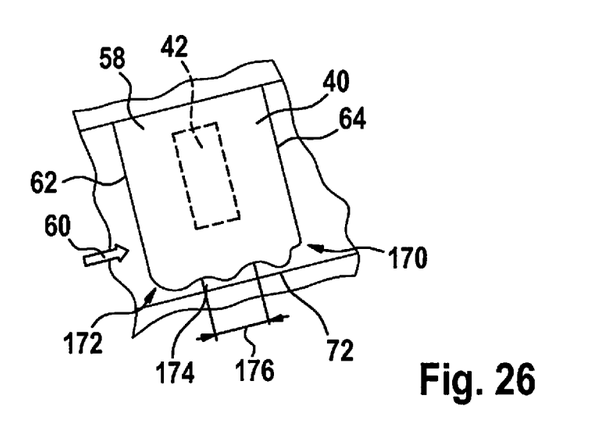
FIG. 26 shows a bottom view of a sensor carrier according to a twelfth specific embodiment.

FIG. 26 shows a bottom view of a sensor carrier 40 according to a twelfth specific embodiment. Only the differences from the preceding specific embodiments are described hereafter and identical components are provided with identical reference numerals. In the twelfth specific embodiment, trailing edge 64 merges in a first radius 170 of 0.1 mm to 2.0 mm, for example, 1.0 mm, into end face 72. Furthermore, end face 72 has sinusoidal recesses 174. Sinusoidal recesses 174 are designed in such a way that the shape thereof has a wavelength 176 of 0.4 mm to 5.0 mm, for example, 1.0 mm.

Figure 27:
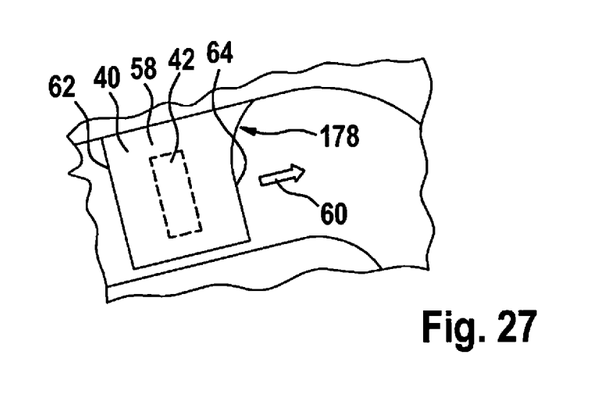
FIG. 27 shows a bottom view of a sensor carrier 40 according to a thirteenth specific embodiment.

FIG. 27 shows a bottom view of a sensor carrier 40 according to a thirteenth specific embodiment. Only the differences from the preceding specific embodiments are described hereafter and identical components are provided with identical reference numerals. In the thirteenth specific embodiment, trailing edge 64 merges in a radius 178 of 0.1 mm to 10.0 mm, for example, 5.0 mm, into the adjoining channel wall of measuring channel 28. A non-tangential transition to the adjoining channel wall of measuring channel 28 is possible.

What is claimed is:

1. A sensor arrangement for determining at least one parameter of a fluid medium flowing through a measuring channel, comprising: a flow tube; a sensor housing introduced into the flow tube, and in which the measuring channel is formed; a sensor carrier protruding into the measuring channel; and at least one sensor chip situated in the measuring channel and for determining the at least one parameter of the fluid medium, wherein the at least one sensor chip is attached on the sensor carrier, and the sensor carrier includes a chord having a length of 4.5 mm to 6.5 mm; wherein the sensor carrier includes a leading edge on an upstream end and a trailing edge on a downstream end, and wherein the leading edge includes at least one recess.

2. The sensor arrangement as recited in claim 1, wherein the sensor housing includes a plug-in sensor.

3. The sensor arrangement as recited in claim 1, wherein the sensor arrangement determines an intake air mass flow of an internal combustion engine.

4. The sensor arrangement as recited in claim 1, wherein: the sensor carrier, with respect to a main flow direction of the fluid medium in the measuring channel, includes an inflow section upstream from the at least one sensor chip and an outflow section downstream from the at least one sensor chip, and the outflow section is one of at least partially rounded and at least partially wedge-shaped.

5. The sensor arrangement as recited in claim 4, wherein the sensor carrier has an asymmetrical cross-section with respect to the chord in the outflow section.

6. The sensor arrangement as recited in claim 1, wherein: the sensor carrier includes an upper side and a lower side opposite thereto, the at least one sensor chip is situated on the upper side, and a distance of the upper side to the chord is greater than a distance of the lower side to the chord.

7. The sensor arrangement as recited in claim 1, wherein:
the sensor carrier extends into the measuring channel in an extension direction, and
the extension direction is essentially perpendicular to a main flow direction of the fluid medium in the measuring channel.

8. The sensor arrangement as recited in claim 7, wherein the sensor carrier tapers in the extension direction.

9. The sensor arrangement as recited in claim 7, wherein the sensor carrier tapers one of symmetrically and asymmetrically in the extension direction.

10. A sensor arrangement for determining at least one parameter of a fluid medium flowing through a measuring channel, comprising: a flow tube; a sensor housing introduced into the flow tube, and in which the measuring channel is formed; a sensor carrier protruding into the measuring channel; and at least one sensor chip situated in the measuring channel and for determining the at least one parameter of the fluid medium, wherein the at least one sensor chip is attached on the sensor carrier, and the sensor carrier includes a chord having a length of 4.5 mm to 6.5 mm; wherein the sensor carrier, with respect to a main flow direction of the fluid medium in the measuring channel, includes an inflow section upstream from the at least one sensor chip and an outflow section downstream from the at least one sensor chip, and wherein the outflow section is one of at least partially rounded and at least partially wedge-shaped, and wherein an upper surface of the sensor carrier is a continuous non-stepped surface at least, with respect to the main flow direction, from a location at which the at least one sensor chip is attached to the sensor carrier, to a downstream end of the sensor carrier, and an underside of the sensor carrier is stepped, via two transition radii, in an upward direction from a first lower surface under the location at which the at least one sensor chip is attached to the sensor carrier to a second lower surface at the downstream end of the sensor carrier, so that the sensor carrier is thicker at the location at which the at least one sensor chip is attached to the sensor carrier than at the downstream end of the sensor carrier.

11. The sensor arrangement as recited in claim 10, wherein, at the downstream end of the sensor carrier, the sensor carrier includes a side surface which transitions to each of the upper surface of the sensor carrier and the second lower surface of the sensor carrier with respective curved transitions defining respective additional transition radii.

\* \* \* \* \*